(12) United States Patent
Dubois et al.

(10) Patent No.: US 6,949,855 B2
(45) Date of Patent: Sep. 27, 2005

(54) TRANSVERSE FLUX ELECTRICAL MACHINE WITH TOOTHED ROTOR

(75) Inventors: Maxime Dubois, Lévis (CA); Henk Polinder, Delfgauw (NL); Jan Abraham Ferreira, Rijswijk (NL)

(73) Assignee: Eocycle Technologies Inc., Lévis (CA)

( * ) Notice: Subject to any disclaimer, the term of this patent is extended or adjusted under 35 U.S.C. 154(b) by 0 days.

(21) Appl. No.: 10/961,089

(22) Filed: Oct. 12, 2004

(65) Prior Publication Data

US 2005/0040720 A1 Feb. 24, 2005

Related U.S. Application Data

(63) Continuation of application No. PCT/CA03/00518, filed on Apr. 7, 2003.
(60) Provisional application No. 60/371,422, filed on Apr. 11, 2002.

(51) Int. Cl.[7] .......................... H02K 1/06; H02K 21/00; H02K 41/02
(52) U.S. Cl. .................. 310/152; 310/12; 310/164; 310/156.01; 310/266
(58) Field of Search .................... 310/154, 156, 310/268, 121, 152, 163–164, 266

(56) References Cited

U.S. PATENT DOCUMENTS

| | | | | |
|---|---|---|---|---|
| 4,663,551 A | * | 5/1987 | Weh et al. | 310/152 |
| 4,965,864 A | * | 10/1990 | Roth et al. | 318/135 |
| 5,051,641 A | * | 9/1991 | Weh | 310/163 |
| 5,633,551 A | * | 5/1997 | Weh | 310/266 |
| 5,773,910 A | * | 6/1998 | Lange | 310/266 |
| 5,854,521 A | | 12/1998 | Nolle | |
| 5,877,578 A | | 3/1999 | Mitcham et al. | |
| 5,886,449 A | * | 3/1999 | Mitcham | 310/254 |
| 5,889,348 A | * | 3/1999 | Muhlberger et al. | 310/218 |
| 6,236,131 B1 | * | 5/2001 | Schafer | 310/163 |
| 6,288,467 B1 | * | 9/2001 | Lange et al. | 310/156.58 |
| 6,664,704 B2 | * | 12/2003 | Calley | 310/257 |

FOREIGN PATENT DOCUMENTS

| | | |
|---|---|---|
| DE | 4314513 A1 * | 11/1994 |
| DE | 4443999 C1 * | 4/1996 |

(Continued)

OTHER PUBLICATIONS

Harris et al., "Performance and design optimisation of electric motors with heteropolar surface magnets and homopolar windings", IEE Proc.-Electr. Power Appl., vol. 143, No. 6, Nov. 1996.

Primary Examiner—Burton Mullins
(74) Attorney, Agent, or Firm—Ogilvy Renault, LLP; Isabelle Chabot (57) ABSTRACT

The invention concerns a transverse flux electrical machine operating with alternating current, having a first element having an alternate arrangement of excitation cores and of flux return cores and a winding of electrical conductors, the winding of electrical conductors being wound as a toroid, inside all said excitation cores; a second element having an exciter section comprising two toothed magnetic structures, each toothed magnetic structure comprising a number of slots equal in number to the total number of excitation cores and of flux return cores, the corresponding slots of each magnetic structure being toothed by being aligned; a magnetized sub-assembly is inserted inside each indentation so that an alternating arrangement of magnetic north poles and south poles is produced in each of these magnetic toothed structures of said exciter section; an air gap between the first element and the second element; at least one of the first element and of the second element being capable of rotating around a rotation axis that is common to the first element and to the second element.

30 Claims, 6 Drawing Sheets

FOREIGN PATENT DOCUMENTS

| | | |
|---|---|---|
| EP | 0 998 010 | 5/2000 |
| EP | 1 005 136 | 5/2000 |
| EP | 1005136 A1 * | 5/2000 |
| EP | WO 97/34515 * | 5/2001 |
| FR | 2 730 873 | 8/1996 |

* cited by examiner

TRANSVERSE FLUX ELECTRICAL MACHINE WITH TOOTHED ROTOR

CROSS-REFERENCE TO RELATED APPLICATIONS

The present application is a continuation of PCT patent application No. PCT/CA03/00518 filed on Apr. 7, 2003 in the French language by Applicant. This PCT application claims priority of U.S. provisional patent application No. 60/371,422 filed on Apr. 11, 2002 in the French language by Applicant. Translations of both of these applications in the English language have been made of record. Both of these applications and their translations in the English language are incorporated herein by reference.

TECHNICAL FIELD OF THE INVENTION

The invention relates to a transverse flux electrical machine, that can be used as an alternator or a motor, and that is intended to convert a rotary movement into an electrical power, and vice versa.

BACKGROUND OF THE INVENTION

Transverse flux electrical machines include a circular stator and a circular rotor, which are separated by an air space called air gap, that allows a free rotation of the rotor with respect to the stator, and wherein the stator comprises soft iron cores, that direct the magnetic flux in a direction that is mainly perpendicular to the direction of rotation of the rotor. The stator of transverse flux electrical machines also comprises electrical conductors, defining a toroid, that is coiled in a direction that is parallel to the direction of rotation of the machine. In this type of machine, the rotor comprises a plurality of identical permanent magnet parts, that are disposed so as to create an alternated magnetic flux in the direction of the air gap. This magnetic flux goes through the air gap with a radial orientation and penetrates the soft iron cores of the stator, which directs this magnetic flux around the electrical conductors.

In the transverse flux electrical machine of the type comprising a rotor, which is made of a plurality of identical permanent magnet parts, and of magnetic flux concentrators, the permanent magnets are oriented in such a manner that their magnetization direction is parallel to the direction of rotation of the rotor. Magnetic flux concentrators are inserted between the permanent magnets and redirect the magnetic flux produced by the permanent magnets, radially towards the air gap.

The transverse flux electrical machine includes a stator, which comprises horseshoe shaped soft iron cores, which are oriented in such a manner that the magnetic flux that circulates inside these cores, is directed in a direction that is mainly parallel to the direction of rotation of the rotor.

The perpendicular orientation of the magnetic flux in the cores of the stator, with respect to the rotation direction, gives to transverse flux electrical machines a high ratio of mechanical torque per weight unit of the electrical machine.

U.S. Pat. No. 5,051,641 describes a transverse flux electrical machine with flux concentration, in which each of the magnetic flux concentrators of the rotor must be fixed to a disc or to a common rotor ring by means of bolts and nuts. This type of machine also includes permanent magnet parts having the same radial dimension as the magnetic flux concentrators, and where each permanent magnet part must be fixed to the magnetic flux concentrators by using a glue that is applied between these two parts. The machine is also provided with a stator, that consists of a plurality of horseshoe shaped soft iron cores which are radially located on both sides of the rotor. The number of horseshoe shaped soft iron cores on the first side of the rotor is equal to the number of horseshoe shaped soft iron cores on the second side of the rotor.

U.S. Pat. No. 5,877,578 presents a transverse flux machine with flux concentration, in which the stator is located on both sides of the rotor, but where the magnets may be inserted into guides. The guides should however be fixed to a disc or a ring by using bolts, which adds to production activities.

U.S. Pat. No. 5,854,521 presents a transverse flux machine without flux concentration where the stator is located on one side only of the rotor, but where the magnets are magnetized perpendicularly to the direction of rotation of the rotor, which increases magnetic leakage fluxes between two adjacent magnets, and consequently decreases the converted power per weight unit of the machine.

The main problems of the transverse flux machine with flux concentration of the prior art are the following. Production of the rotor is difficult, because the magnetic flux concentrators must be fixed to a disc or a common rotor ring by means of bolts and nuts. The machine as a whole is not very rigid since the stator is localized on both sides of the rotor. Finally, the maximum value of the mechanical torque on the shaft of the machine per weight unit of the machine is limited by the magnetic saturation of the horseshoe shaped cores, since the distance of the air gap is the same in the aligned and unaligned position of the rotor.

SUMMARY OF THE INVENTION

The main objects of the transverse flux machine designed according to the invention are the following.

First, production of the rotor is facilitated, thanks to the presence of slots and teeth defining a toothed magnetic structure, providing natural mechanical guides for the insertion of the magnetic blocks of the rotor.

Second, the mechanical rigidity of the electrical machine as a whole is increased, since the stator is located on a single side with respect to the rotor, and since guides supporting the magnetic blocks of the rotor as a whole are used at the rotor.

Third, the transverse flux electrical machine, as designed according to the invention has a high value of maximum mechanical torque on the shaft of the machine per weight unit of electrical machine. An increase of this value is allowed through a high electrical current in the electrical conductors of the stator, this improvement resulting from a thicker air gap in the unaligned position of the rotor than in the aligned position of the rotor. This difference in the air gap distance allows a decrease of the inductance of the stator for the unaligned position, which inductance decrease increases the admissible electrical current before reaching magnetic saturation of the soft iron cores of the stator.

The invention aims at providing a transverse flux electrical machine having at least one of the two characteristics described hereinafter.

The first characteristic is the ease of installation of the parts of the permanent magnet and of the magnetic flux concentrators with rotor structure, by inserting the latter inside the rotor structure, which contains toothed guides. Such guides allow for an easy insertion of the sub-assembly made of permanent magnets and magnetic flux concentrators, and a retention of said sub-assembly is made easy, without requiring bolts and nuts. This characteristic permits to reduce the time of production of the transverse flux machine provided with permanent magnets and magnetic flux concentrators.

The second characteristic is an increase of the air gap distance between the horseshoe shape soft iron cores of the stator and the rotor, for the unaligned position of the rotor, while preserving an air gap distance that is as small as possible between said horseshoe shaped soft iron cores of the stator and the magnetic flux concentrators of the rotor, in the aligned position of the rotor.

The unaligned position of the rotor is defined as being the position of the rotor with respect to the stator for which the magnetic poles of the rotor do not face the soft iron cores of the stator. The so-called aligned position is defined as being the position of the rotor with respect to the stator, for which the magnetic poles of the rotor face the horseshoe shaped soft iron cores.

A more important air gap distance in the unaligned position, than in the aligned position of the rotor permits to increase the magnitude of the maximum current that may flow in the conductors, before reaching magnetic saturation of the soft iron cores of the stator. The result is a higher power converted by the machine, per weight unit.

Preferably, the present invention uses an entirely localized stator on one side only of the rotor ring. Such a construction presents a higher mechanical rigidity of the rotor and of the stator, and allows to more easily reduce the air gap distance between the rotor and the stator.

According to the invention, these characteristics are obtained, in a transverse flux machine, thanks to two toothed magnetic structures, which consist of identical stacking of soft iron sheets at the rotor, the latter sheets having slots and teeth. A magnetic sub-assembly of the rotor comprises a soft iron magnetic flux concentrator, a non-magnetic block and two permanent magnet parts, said permanent magnets being disposed on both sides of the magnetic flux concentrator. Magnetic sub-assemblies of the rotor are inserted in said slots of the rotor, that serve as insertion guides and fixation structure. Each magnetic sub-assembly of the rotor is inserted into its slot, in such a manner that the distance between the surface of the magnetic flux concentrator that faces the air gap and the bottom of the slot is greater than the distance between the tip of the teeth the bottom of the slot.

The stator is formed of two types of soft iron cores, that are radially located on one side only with respect to the rotor. The first type of magnetic pieces of the stator is called "horseshoe shaped soft iron core", and is obtained by stacking soft steel sheets, having the shape of a horseshoe. The second type of magnetic pieces of the stator is called "flux return soft iron core". It is formed by stacking steel sheets, and is preferably trapezoidal in shape. The number of soft iron cores of the first type is equal to the number of soft iron cores of the second type, the two types of cores being alternately and peripherally disposed, and positioned at the stator, in such a manner that each core of the stator generally faces a magnetic flux concentrator of the rotor, in radial direction.

In order to reduce losses of magnetic field at the stator between the two types of cores, overlapping thereof is minimized in an electrical machine designed according to the invention. Thus, the two types of stator core are designed in such a manner that the longer dimension of the flux return soft iron core is inferior to the exterior distance of the horseshoe shaped soft iron core, which exterior distance is measured at the end of the legs of the horseshoe.

The stator also has a winding of electrical conductors, toroidally wound and peripherally located in the interior part of all the horseshoe shaped soft iron cores. In the radial direction of the electrical machine, said winding is in contact with the interior edge of the horseshoe shaped soft iron cores, and is also in contact with the flux return soft iron core.

According to a broad aspect of the present invention, the invention concerns an alternating current electrical machine having a first element having alternate excitation cores and flux return cores, without contact, and a winding of electrical conductors, the winding of electrical conductors being wound around all said excitation cores; a second element having an exciter section comprising two toothed magnetic structures that are insulated from one another by means of a non-magnetic insulator material, each of the toothed magnetic structures comprising a number of slots equal in number to the total number of excitation cores and flux return cores, the corresponding slots of each of the toothed magnetic structures being aligned; inside each slot, a magnet is inserted in such a manner that an alternate arrangement of the magnetic north and south poles is produced in each of the toothed magnetic structures of said exciter section; an air gap between the first element and the second element; at least one of the first element and the second element can rotate around an rotation axis that is common to the first element and the second element.

According to another aspect of the present invention, the invention concerns a transverse flux electrical machine with alternating single phase current, comprising magnetic parts inserted inside the rotor structure, that contains toothed guides, the guides allowing an easy insertion and a retention of said magnetic parts.

According to another broad aspect of the present invention, the invention concerns an electrical device comprising a plurality of transverse flux electrical machines, the machines being axially placed side by side and sharing a common rotation axis.

BRIEF DESCRIPTION OF THE DRAWINGS

The characteristics, aspects and advantages of the present invention as mentioned above as well as others will be better understood by means of the description which follows and the accompanying drawings, in which.

DETAILED DESCRIPTION OF A PREFERRED EMBODIMENT OF THE INVENTION

Figure 1:
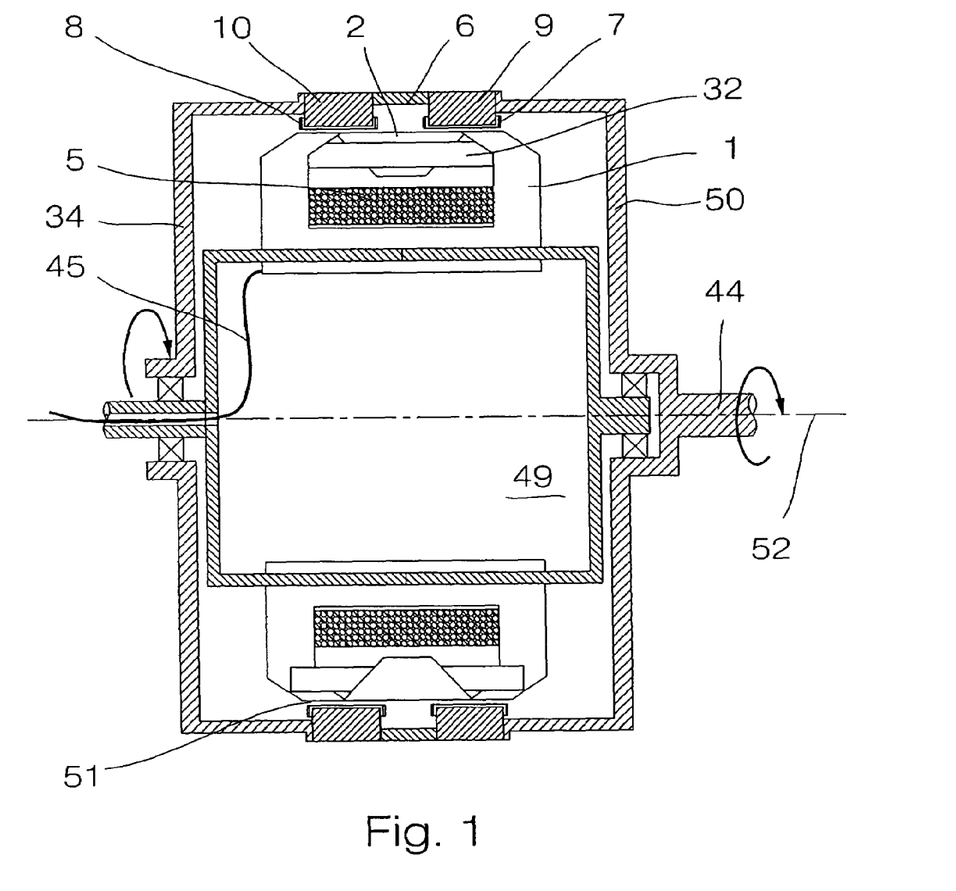
FIG. 1 illustrates a cross-section in elevation of a transverse flux machine with exterior rotor according to a preferred embodiment of the invention.

In FIG. 1, the transverse flux machine of a preferred embodiment of the invention is illustrated in a configuration where stator 49 is located at a shorter distance from the rotation axis 52 of the machine in the radial direction, than rotor 50. Rotor 50 is exterior and rotates around stator 49, that is interior. Electrical connections 45 of the stator run through the rotation axis 44 of the stator, the latter being fixed. An air gap 51 is present between magnetic flux concentrators 7 and 8 and soft iron cores 1 and 2. Supporting cylinder 34 serves to hold the rotor.

Toothed magnetic structures 9 and 10 define cylinders, that can be kept together by means of non-magnetic insulating material 6 (by passing non-magnetic rods connecting elements 6, 9 and 10 together). This assembly 6, 9 and 10 must be connected to the rotation shaft, and this may be achieved by bolting toothed magnetic structures 9 and 10 to supporting cylinder 34, that possesses a mechanical connection with the rotating shaft.

Figure 2:
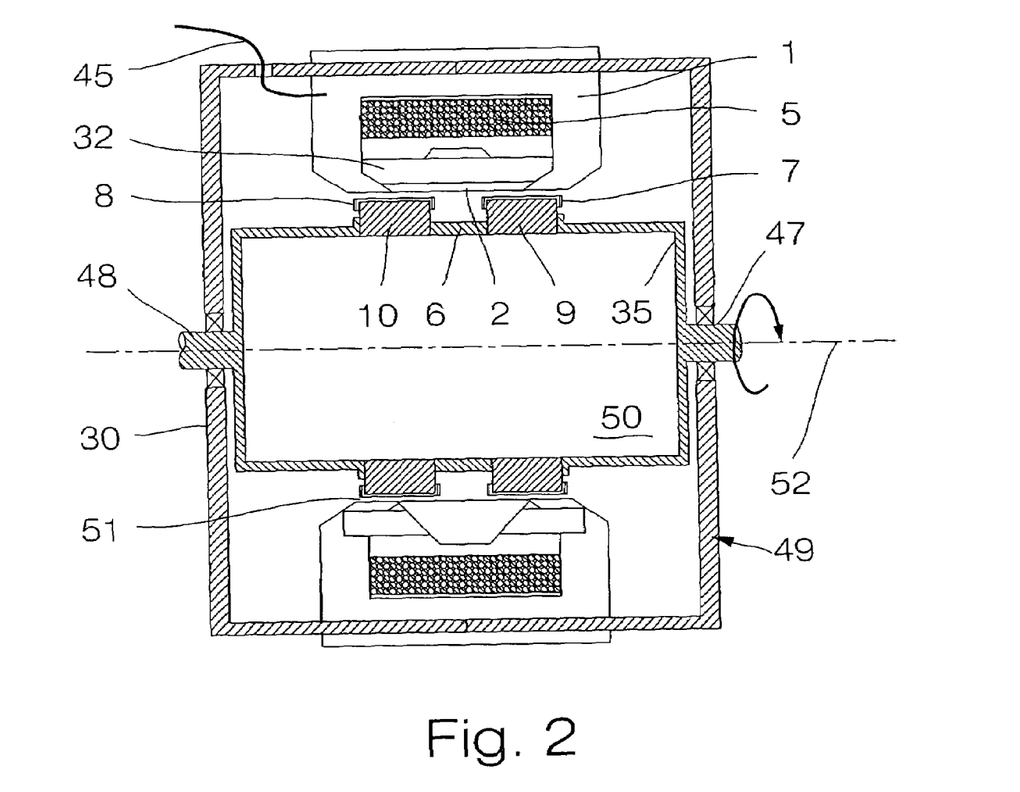
FIG. 2 illustrates a cross-section in elevation of a transverse flux machine with interior rotor according to a preferred embodiment of the invention.

In FIG. 2, the traverse flux machine of a preferred embodiment of the invention is illustrated in a configuration where the stator is located farther away from the rotation axis 52 of the machine in its radial direction, than rotor 50. Rotor 50 has two rotation shafts 47, 48 centered on the rotation axis 52, and are accessible from both sides of the machine. The rotation shaft 48 is connected to toothed magnetic structure 10 on one side of the machine, by means of circular plate 36. Rotation shaft 47 is connected to toothed magnetic structure 9 on the other side of the machine, by means of circular plate 35. The two toothed magnetic structures 9, 10 are connected to one another by means of non-magnetic insulating material 6. The stator elements are maintained by the cylinder of the stator support 30, which is kept fixed. The electrical connections 45 are accessible outside the machine by means of an opening provided locally through the cylinder of the stator support 30.

Preferably, the cylinder of the stator support 30 is indented with the same number of slots as the number of horseshoe shaped cores. The horseshoe shaped cores are inserted in these slots, and are kept in place by means of screws between these horseshoes and the holding piece 31.

Either one of the two pieces 49 and 50 illustrated in FIGS. 1 and 2 could be the rotor or the stator. Preferably, the stator 49 is fixed and contains the winding, and the rotor 50 contains the magnets. If the winding is on the part that must rotate, connections must then be outwardly provided by means of slip rings (rotating electrical wires will be wound around the shaft). Slip rings are possible at low currents, but at high currents, they will generate arcs on the rings, and will reduce the lifetime of the machine.

In the preferred embodiment of the invention, the stator is either inside the rotor (configuration of FIG. 1) or outside the rotor (configuration of FIG. 2). There is no situation where the fixed elements (the stator) are both inside and outside the rotor. The stator is therefore located on one side only with respect to the rotor.

Figure 3:
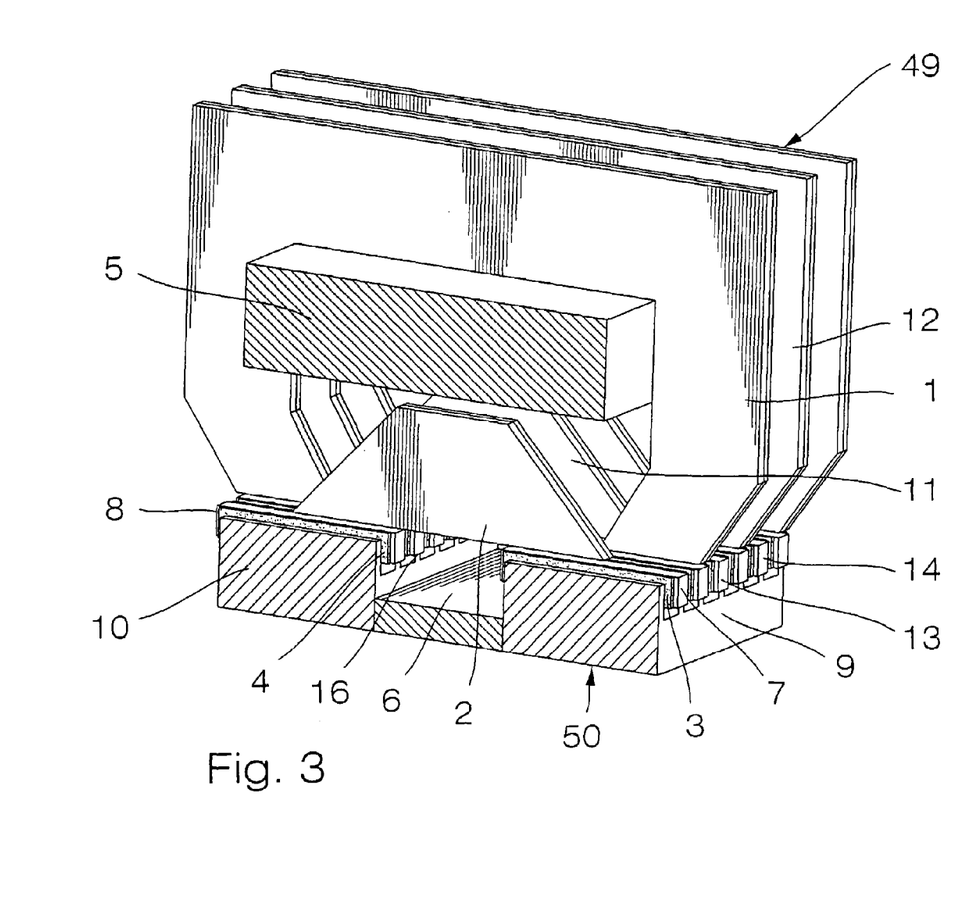
FIG. 3 is a front view in perspective, showing six poles of a transverse flux machine prepared according to a preferred embodiment of the invention.

FIG. 3 represents a section of three (3) pairs of poles, where each pair of poles consists of a horseshoe shaped soft iron core 1 at the stator, a return flux soft iron core 2 at the stator, magnetic flux concentrators 7, 8 at the rotor, and permanent magnets 3, 4 at the rotor. The rotor and the stator of the transverse flux machine according to a preferred embodiment of the invention, are made of a plurality of pairs of identical magnetic poles disposed adjacent to one another in the direction of movement of the rotor.

Figure 5:
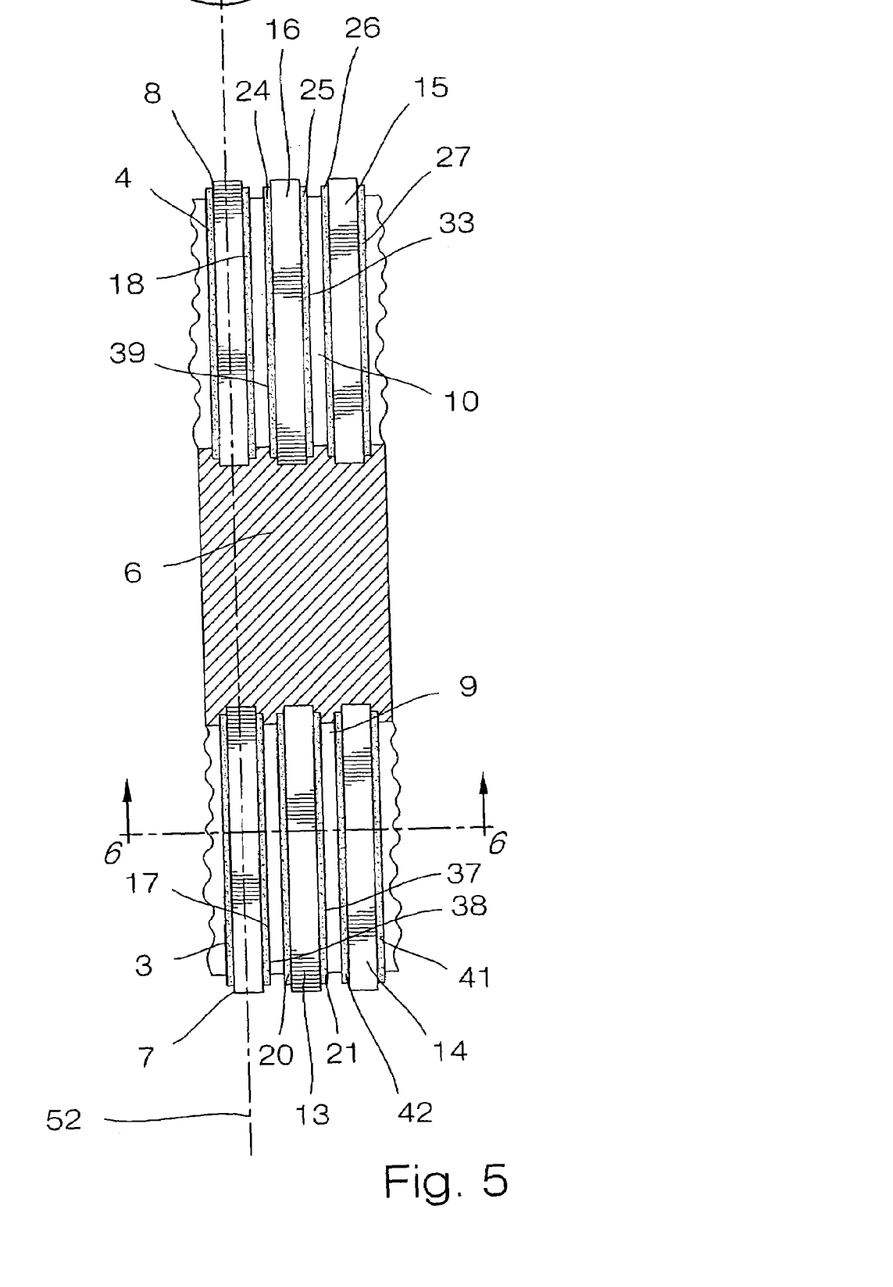
FIG. 5 illustrates a view from above of three poles of the rotor of the transverse flux machine according to a preferred embodiment of the invention, from a plane that is tangent to the air gap, the parts of the stator not being illustrated.

At the rotor, each pole comprises two concentrators of magnetic flux 7, 8 and four magnets 3, 17, 4, 18 (see FIG. 5). Two toothed magnetic structures 9, 10 are identical and are separated by a non-magnetic insulating material 6. Each of the toothed structures 9, 10 has a number of teeth and slots that is equal to the number of magnetic poles. Each of the slots of the toothed magnetic structure 9 receives a magnetic flux concentrator and two magnets, which are disposed on both sides of the magnetic flux concentrator.

At the stator, each pair of poles comprises a horseshoe shaped soft iron core 1, and a flux return soft iron core 2, which are disposed side by side so that the two ends of horseshoe shaped core 1 generally face the exterior ends of the two magnetic flux concentrators 13, 16 comprised by a first pole of the rotor, and the ends of the flux return soft iron core 2 generally face the interior ends of the magnetic flux concentrators 7, 8 comprised by a second pole of the rotor.

The flux return soft iron cores are preferably trapezoidal in shape. However, it is understood that they could have other shapes without departing from the essence of the invention. For example, a half moon shape could be possible, or still a rectangular shape. In the case of the rectangular shape, the performances are inferior, because of magnetic leakage between the horseshoe core and the flux return core. A staircase shape could also be possible, where the slope of the staircase would follow the contours of an equivalent trapeze.

Alternating between horseshoe shaped soft iron cores and stator flux return soft iron cores allows a relaxation of each magnet of the rotor between each excitation. The flux return cores allow to complete the magnetic circuit. They also permit to reduce magnetic leakage between neighboring flux concentrators. It would be possible to remove them, and to complete the magnetic circuit by replacing the non-magnetic material used for part 6, with a magnetic material. However, this will increase leakage between neighboring concentrators, and will consequently decrease the no-load magnetic flux (without current) that flows in the horseshoe core. Also, this will increase the inductance of the stator, and will reduce the current that is admissible in the stator before reaching magnetic saturation of the horseshoe cores. These two factors will have as a consequence a lower power that is converted by the machine. If these flux return cores are omitted, the machine will be less performing, but this machine will potentially have performances that are superior to other conventional machines. Moreover, manufacture of the machine will be easier if these flux return cores are omitted.

At the stator, a winding of electrical conductors 5 that is common to all the poles, is disposed inside horseshoe shaped soft iron cores 1, 12, which bound said winding of electrical conductors 5 on three of its four faces. The flux return soft iron cores 2, 11 are located between the fourth face of said winding of electrical conductors 5 and rotor 50. There is only one winding 5, and it comprises all the horseshoe shaped cores. This gives a very simple winding. The winding defines a doughnut around which there is a plurality of horseshoes.

Figure 4:
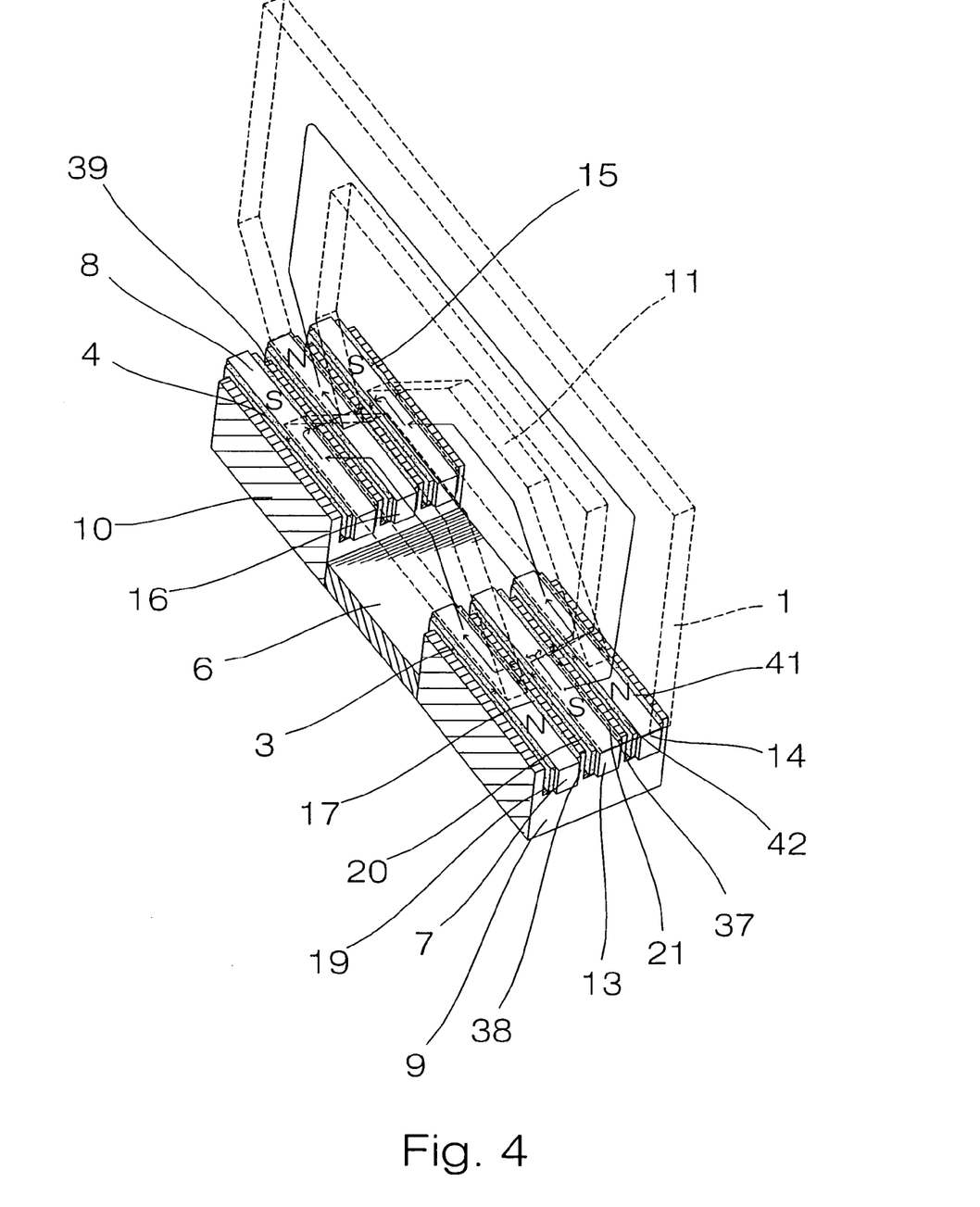
FIG. 4 is a view from above in perspective of three poles of a transverse flux machine according to a preferred embodiment of the invention, showing the parts of the rotor in full lines, and the soft iron cores of the stator in dotted lines for simplicity purpose.

In FIG. 4, a second view in perspective shows the circulation of the magnetic flux between the poles of the rotor illustrated in full lines and the poles of the stator illustrated in dotted lines. The two toothed magnetic structures 9, 10 of the rotor are separated by a non-magnetic insulant 6. Each slot of said toothed magnetic structures 9, 10 contains a magnetic flux concentrator 7, that is bounded on both sides by two permanent magnets 3, 17 having mutually opposed magnetization directions. The two permanent magnets 3, 17 and the flux concentrator 7 are insulated from the bottom of the slot of the toothed magnetic structure 9, by means of a non-magnetic block (see FIG. 6). The group consisting of two permanent magnets 3, 17, magnetic flux concentrator 7, and non-magnetic block 19 is identified as forming a "magnetic sub-assembly of the rotor".

The non-magnetic block of the magnetic sub-assembly allows to insulate the magnetic flux concentrator from the bottom of the slot. If the concentrator would contact the bottom of the slot, there would be a large amount of magnetic flux that would exit from the magnet, would penetrate into the concentrator, and would reach the slot, down to the toothed structure. This flux would return into the magnet, which would then constitute an important magnetic leak, and would reduce the quantity of flux passing through the air gap. It is therefore advantageous to keep a space between the concentrator and the bottom of the slot.

Mechanically, the way in which this space is maintained can vary. The preferred embodiment of the invention comprises a non-magnetic block. Mechanically, this embodiment allows to keep the magnetic sub-assembly well at the bottom of the slot. However, it is possible to use a holding retaining method that would be different, and to replace this non-magnetic block by an air space. The non-magnetic block may therefore be omitted without departing from the invention.

Instead of the magnetic sub-assembly of the rotor, that is formed by the magnetic flux concentrator, the two permanent magnets and the non-magnetic block, it would be possible to use one magnet only. However, this magnet will have to be magnetized in a direction that is perpendicular to the direction of rotation of the rotor, in order to generate a magnetic flux that is directed towards the stator. The quantity of magnets will be larger. The main problem of this configuration is the increase of magnetic leakage between neighboring magnets that will diminish the performances of the machine.

The toothed magnetic structure 9 contains an even number of pairs of slots, and each slot contains a magnetic sub-assembly of the rotor, that is constituted in such a manner that the direction of the radial magnetic flux be opposed to the direction of the radial magnetic flux of the magnetic sub-assembly of the two neighboring slots. Thus, the magnetic flux concentrator 13 is bounded by two magnets 20, 21 whose magnetization is directed towards teeth 37, 38.

The magnetic flux concentrator 13 absorbs the radial magnetic flux, in the manner of a magnetic south pole. Magnetic flux concentrator 7, that is adjacent magnetic flux concentrator 13, is bounded by two magnets 3, 17 whose magnetization is directed towards magnetic flux concentrator 7. Magnetic flux concentrator 7 expels the radial magnetic flux, in the manner of a magnetic north pole. Such an arrangement of the magnetic north poles and of the magnetic south poles therefore generates a magnetic flux that originates in magnets 3, 17, is expelled by magnetic concentrator 7, passes through the air gap and penetrates the stator, inside the flux return soft iron core 2, until reaching magnetic flux concentrator 8, that absorbs it like a magnetic south pole. The magnetic flux is then redirected through magnetic tooth 39, towards magnetic flux concentrator 16, that acts as a magnetic north pole, while expelling it in radial direction, through air gap 51 as far as the horseshoe shaped soft iron core 1, as far as magnetic flux concentrator 13, that absorbs it like a south pole. Inside magnetic flux concentrator 13, the flux is redirected towards tooth 38 through magnets 20, 17, as far as magnetic flux concentrator 7, which ends the looping of the magnetic flux.

In FIG. 5, the cores of the stator and the winding have been removed, and the three poles of the rotor are seen from the rotation axis. The directions of magnetization of the permanent magnets of the rotor are such that, in any plane that is oriented similarly as rotation axis 52, and cutting two permanent magnets of the rotor, these two permanent magnets have opposite magnetization directions, which directions will be globally perpendicular to said plane. Thus, the plane that is similarly oriented as the rotation axis which cuts permanent magnet 4, which magnet has a direction of magnetization that is perpendicular to said plane, also cuts permanent magnet 3, that has a direction of magnetization that is perpendicular to the plane, and that is opposite the direction of magnetization of permanent magnet 4. The magnetic flux concentrators 8, 16, 15, 7, 13, 14 are illustrated in FIG. 5. Magnets 4, 18, 24, 25, 26, 27, 3, 17, 20, 21, 42 and 41 are illustrated in FIG. 5. Teeth 39, 33, 38 and 37 are illustrated in FIG. 5.

The direction of magnetization of the permanent magnets is preferably oriented in a parallel direction with respect to the direction of rotation of the rotor. However, it is understood that the magnets could be placed slightly at an angle without departing from the essence of the invention, and the machine would give equivalent performances. Obviously, in such a case, the direction of magnetization would not be completely parallel to the direction of rotation of the rotor.

Figure 6:
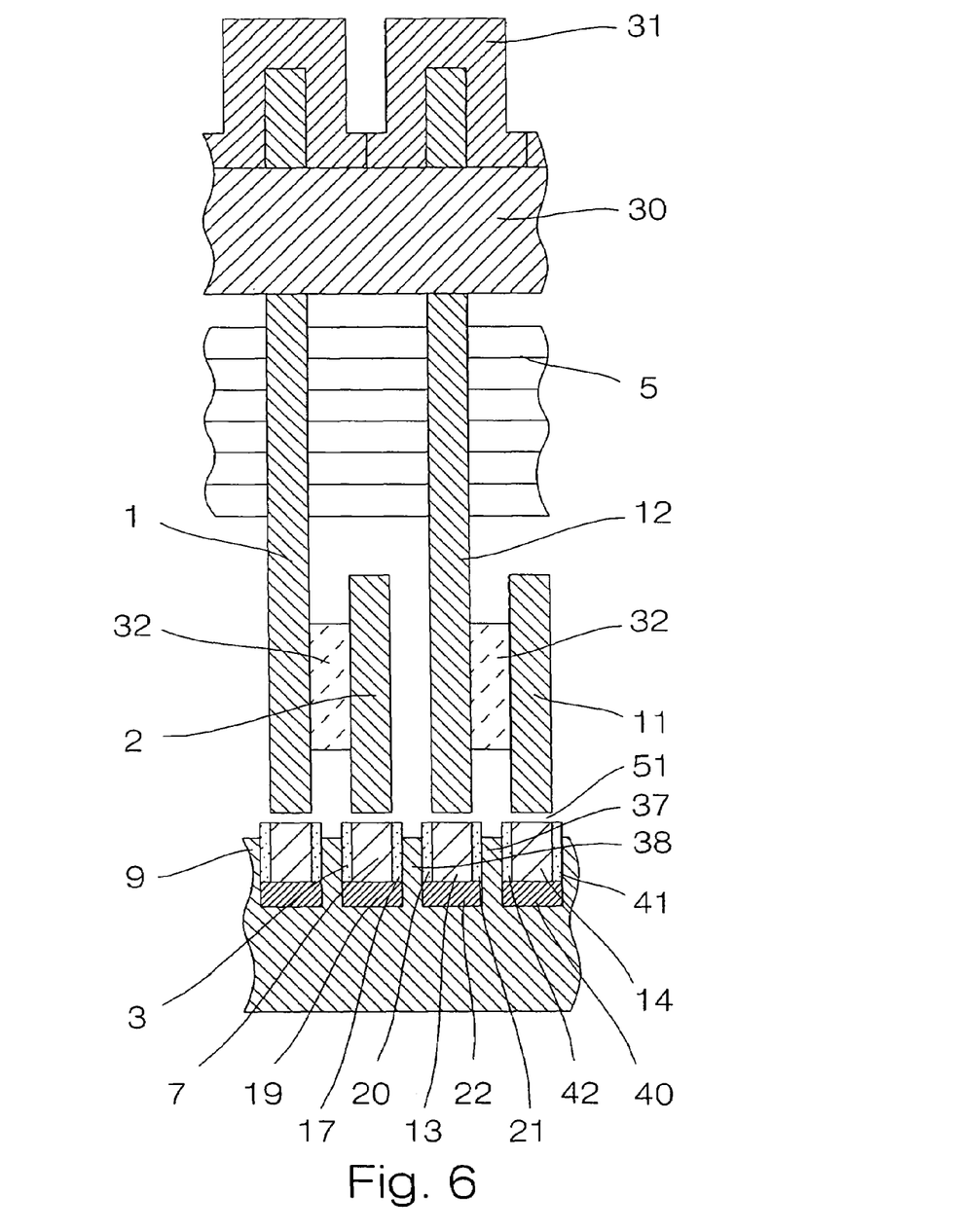
FIG. 6 illustrates a cross-section taken along plane A—A of FIG. 5, of a section of four poles of the rotor and of the stator of a transverse flux machine according to a preferred embodiment of the invention, the parts of the stator being illustrated.

In FIG. 6, a cross-section in a plane whose normal is oriented similarly to the axis of rotation, through the toothed magnetic structure 9 (according to section A—A of FIG. 5) illustrates four poles of the rotor and of the stator. At the rotor, the slots of the toothed magnetic structure 9 are filled with non-magnetic blocks 19, 22, 40, that have a relative magnetic permeability which is approximately equal to that of air. Above the four non-magnetic blocks, there are flux concentrators 7, 13, 14 and magnets 3, 17, 20, 21, 41, 42. In each slot there is a non-magnetic block, a flux concentrator and two magnets. The two magnets located on both sides of the flux concentrator have directions of magnetization that are mutually opposed.

The parts of the stator illustrated in FIG. 6 are horseshoe shaped soft iron cores 1, 12, flux return soft iron cores 2, 11, electrical conductor 5, stator support cylinder 30 and stator support bars 32. Horseshoe shaped magnetic conductors 1, 12 are inserted into stator support cylinder 30, the latter being made of a non-magnetic material. Each flux return soft iron core 2, 11 is fixed to a horseshoe shaped soft iron core 1, 12, by means of a stator support bar 32, the latter being made of a non-magnetic and non-electrically conducting material (plastic or resin). They are used to keep in place the magnetic elements. It is understood that this retention function could be done otherwise. A protection 31 may be placed at the ends of the soft iron cores to prevent them from being detached from support cylinder 30. Element 31 is only used to keep in place the horseshoe shaped magnetic cores. It is understood that this retention function could be achieved otherwise.

The preferred dimensions of the machine according to a preferred embodiment of the invention can vary. The diameter of the machine will vary between 5 cm and 5 meters. The air gap 51 will be between 0.1 mm and 10 mm. The horseshoe shaped cores 1 will have a length that varies from 5 cm to 100 cm. The permanent magnets 3, 4 will have a thickness that varies from 0.5 mm to 10 mm. The length of the flux concentrators 7, 8 will vary between 10 mm and 200 mm.

The following materials are preferably used for the construction of each of the elements as follows: the non-magnetic insulant 6 is made of aluminum, stainless steel, plastic or resin; the magnetic flux concentrators 7, 13, 14 are made of iron powder, steel blocks or steel laminations Fe—Si; the toothed magnetic structures 9, 10 are made of Fe—Si laminations; the non-magnetic blocks 19, 22, 40 are made of plastic, resin, stainless steel or aluminum; the stator support cylinder 30 is made of stainless steel or aluminum; the stator support bars 32 are made of plastic or resin; the horseshoe shaped cores and flux return cores are made of Fe—Si laminations, but iron powder could also be used.

When using the machine according to a preferred embodiment of the invention in generator mode, the electrical connections may be directly connected to a resistive charge, or directly to an AC/DC rectifier. The mechanical shaft is then drawn by a mechanical movement that is either hydraulic, windborne, or the like, and the machine converts the mechanical movement into electrical power. As soon as a mechanical movement appears, the conversion will take place.

When using the machine according to a preferred embodiment of the invention in motor mode, the electrical connections should be connected to an inverter that will generate a variable frequency. To start up the motor, the user will have to send instructions to the inverter to increase its frequency and its electrical voltage following a gradual notice, until reaching the desired speed. The user will then be able to vary the rotation speed at will, by adjusting the frequency and inverter voltage notice.

It is good to take note that a plurality of transverse flux electrical machines can by placed side by side in the axial orientation, to share a common rotation axis. All the electrical conductor windings may then be supplied with a single phase alternating current.

If these machines are placed side by side, they can have a circumferential shift of the exciter section of the rotor, or a circumferential shift of the horseshoe shaped soft iron cores and of the magnetic flux return soft iron cores of the stator. The winding of the electrical conductors is then supplied with polyphased alternating currents, that are independent for each of the transverse flux machines that are located on the rotation axis.

What is claimed is:

1. A transverse flux electrical machine, comprising
a first element having an exciter section comprising a number of toothed magnetic structures;
a second element having excitation cores, and a winding of electrical conductors, said winding of electrical conductors wound so as to enclose all of said excitation cores; said second element is located on a single side of said first element;
a single planar air gap between said first element and said second element parallel to an axis of rotation of any one of said first and said second element;
each of said toothed magnetic structures is formed from a single integral piece which comprises a number of slots and teeth, said teeth facing said air gap;
inside each said slots, a magnetic block formed by two permanent magnets and one flux concentrator is inserted in such a manner that an alternating arrangement of magnetic north poles and south poles is formed in each of said toothed magnetic structures of said exciter section, and said north poles expel the magnetic field through the air gap, and said south poles absorb the magnetic field that passes through the air gap, said permanent magnets are oriented in a direction that is perpendicular to an axis of rotation of any one of said first and said second element.

2. A machine as claimed in claim 1, further comprising flux return cores placed in a space provided between each of said excitation cores and without contact with said excitation cores, wherein said flux return cores are in contact with the air gap.

3. A machine as claimed in claim 2, in which largest dimension of each said flux return cores is inferior to a distance between two edges of each said excitation cores, wherein said edges are in contact with said air gap.

4. A machine as claimed in claim 2, in which the winding is bounded along three sides with a plurality of excitation cores, and on the fourth side with a plurality of flux return cores.

5. A machine as claimed in claim 1, in which in addition to said magnetic block, in each said slot, there is inserted a non magnetic block that is placed between a bottom of the slot and said magnetic block.

6. A machine as claimed in claim 1, in which in addition to said magnetic block, in each said slot, an air space is provided between a bottom of the slot and said magnetic block.

7. A machine as claimed in claim 1, in which said flux concentrator is placed between said two permanent magnets.

8. A machine as claimed in claim 1, in which said winding runs in a direction that is parallel to the direction of movement of one of the first element and the second element.

9. A machine as claimed in claim 1, in which the thickness of the air gap between the ends of said excitation cores and said magnetic blocks is shorter than the distance between the ends of said excitation cores and the teeth separating said slots of said toothed magnetic structures.

10. A machine as claimed in claim 1, in which said winding of electrical conductors is supplied with a single phase alternating current.

11. A machine as claimed in claim 1, in which at least one of said first element and said second element can rotate around a rotation axis that is common to said first element and said second element.

12. A machine as claimed in claim 11, in which the winding is toroid-shaped, wound parallel to the direction of rotation of the second element.

13. A machine as claimed in claim 11, in which said exciter section is located outside of said first element, a distance between the rotation axis and said magnetic blocks is larger than a distance between said rotation axis and said winding of electrical conductors.

14. A machine as claimed in claim 11, in which said exciter section is located inside said first element, in such a manner that the a distance between said rotation axis and said magnetic blocks is shorter than a distance between said rotation axis and said winding of electrical conductors.

15. An electrical apparatus comprising a plurality of electrical transverse flux machines according to claim 11,
said machines being placed side by side in axial orientation;
said machines sharing a common rotation axis;
said windings of electrical conductors supplied with a single phase alternating current.

16. An electrical apparatus comprising a plurality of electrical transverse flux machines according to claim 11,
said machines being placed side by side in axial orientation;
said machines sharing a common rotation axis;

said exciter section having a circumferential offset, the winding of electrical conductors being supplied with polyphased alternating currents, that are independent for each said transverse flux machines located on said rotation axis.

17. A machine as claimed in claim 11, in which the toothed magnetic structures are of a generally cylindrical shape and are centered on said rotation axis.

18. A machine as claimed in claim 1, in which the toothed magnetic structures are used in a linear configuration.

19. A machine as claimed in claim 1, wherein said single integral piece forming said toothed magnetic structure is a stack of identically stamped magnetic laminations.

20. Transverse flux electrical machine, comprising a first element having an exciter section, and a second element, made of a winding of electrical conductors, which winding is fixed, characterized in that the exciter section of the first element is made of two toothed magnetic structures, which toothed magnetic structures are insulated from one another by means of a non-magnetic insulant, which toothed magnetic structures each contain a number of slots whose number is equal to the number of magnetic poles of said electrical machine, magnetic blocks being inserted inside said slots, in a quantity corresponding to one magnetic block per slot, said second element is provided on a single side of said first element, each said toothed magnetic structures is formed from a single integral piece, said magnetic block consists of two permanent magnets and one flux concentrator, said permanent magnets are oriented in a direction that is perpendicular to an axis of rotation of any one of said first and said second element;

said second element being made of horseshoe shaped cores, in a quantity that is equal in number to half the number of said magnetic poles, and of flux return cores, whose quantity is equal to half the number of said magnetic poles, said horseshoe shaped cores and flux return cores being disposed peripherally in an alternating arrangement, said horseshoe shaped cores and said flux return cores are not in contact, are located on one side only with respect to said exciter section of the first element and are separated from said first element by means of single planar air gap parallel to an axis of rotation of any one of said first and said second element, the radial faces of two respective ends of said horseshoe shaped cores and flux return cores are generally facing two of said magnetic blocks;

said winding of electrical conductors being located inside said horseshoe shaped cores.

21. A machine as claimed in claim 20, in which the first element is a rotor rotating around a rotation axis.

22. A machine as claimed in claim 21, in which the winding is disposed circularly in a direction that is parallel to the direction of rotation of the first element.

23. A machine as claimed in claim 20, in which the magnetic blocks comprise a non-magnetic block, the non-magnetic block being located between the bottom of the slot and the magnetic flux concentrator, and inside said magnetic blocks, each magnetic flux concentrator is insulated from said teeth by means of the two said permanent magnets, which have magnetization directions that am mutually opposed, in such a manner that said concentrators of magnetic flux combine the magnetic fluxes produced by their permanent magnets, and redirect them radially towards the air gap and towards the second element, forming in the exciter pert of the first element an alternating arrangement of magnetic north poles and magnetic south poles.

24. Transverse flux electrical machine according to claim 23, characterized in that a shortest air gap distance between the ends of said horseshoe shaped cores and said magnetic flux concentrators, is shorter than the distance between the ends of said horseshoe shaped cores and the teeth of said toothed magnetic structures, and that a shortest air gap distance between the ends of said flux return cores and said magnetic flux concentrators is shorter than the distance between the ends of said flux return cores and the teeth of said toothed magnetic structures.

25. Transverse flux electrical machine according to claim 20, characterized in that a largest dimension of each said flux return core is smaller than the distance between two edges of each said horseshoe shaped soft iron core and in contact with the air gap, said edges being furthest apart along a plane including the air gap and parallel to the direction of movement of said first element.

26. Transverse flux electrical machine according to claim 20, characterized in that said exciter section is radially arranged on the first element.

27. Transverse flux electrical machine according to claim 20, characterized in that said exciter section of the first element is located outside said second element, in such a manner that the distance between the rotation axis and said magnetic blocks is larger than the distance between said rotation axis and said winding of electrical conductors.

28. Transverse flux electrical machine according to claim 20, characterized in that said exciter section of the first element is located inside said second element, in such a manner that the distance between said rotation axis and said magnetic blocks is smaller than the distance between said rotation axis and said winding of electrical conductors.

29. Transverse flux electrical machine, characterized in that a plurality of transverse flux electrical machines according to claim 20, placed side by side in axial orientation, share one common said rotation axis, having said windings of electrical conductors of each of said machines supplied with a single phase alternating current.

30. A machine as claimed in claim 20, wherein said single integral piece forming said toothed magnetic structure is a stack of identically stamped magnetic laminations.

* * * * *